United States Patent [19]

Shikichi et al.

[11] Patent Number: 5,150,345
[45] Date of Patent: Sep. 22, 1992

[54] OPTICAL INFORMATION RECORDING APPARATUS PROVIDED WITH MEANS FOR SAMPLING AND HOLDING A SERVO SIGNAL WHEN THE INTENSITY OF A LIGHT BEAM VARIES BETWEEN INTENSITY LEVELS

[75] Inventors: Satoshi Shikichi, Tokyo; Shigeto Kanda, Machida, both of Japan

[73] Assignee: Canon Kabushiki Kaisha, Tokyo, Japan

[21] Appl. No.: 794,644

[22] Filed: Nov. 18, 1991

Related U.S. Application Data

[63] Continuation of Ser. No. 711,423, Jun. 5, 1991, abandoned, which is a continuation of Ser. No. 225,722, Jul. 28, 1988, abandoned.

[30] Foreign Application Priority Data

Aug. 12, 1987 [JP] Japan .................... 62-200037

[51] Int. Cl.$^5$ ................................. G11B 7/00
[52] U.S. Cl. ......................... 369/44.34; 369/44.36
[58] Field of Search ............... 369/44.34, 44.35, 44.36; 250/201.5

[56] References Cited

U.S. PATENT DOCUMENTS

| | | | |
|---|---|---|---|
| 4,467,462 | 8/1984 | Shibata | 369/46 X |
| 4,535,431 | 8/1985 | Bricot et al. | 369/44.13 |
| 4,593,386 | 6/1986 | Kawabara et al. | 369/44.34 |
| 4,603,410 | 7/1986 | Yoshida | 369/46 X |
| 4,611,317 | 9/1986 | Takeuchi et al. | 369/45 |
| 4,616,354 | 10/1986 | Yoshida | 369/46 X |
| 4,661,942 | 4/1987 | Yoshimoto et al. | 369/44.34 |
| 4,701,603 | 10/1987 | Dakin et al. | 369/45 X |
| 4,710,909 | 12/1987 | Tsuyoshi et al. | 369/44.34 X |
| 4,751,695 | 6/1988 | Kaku et al. | 369/44.34 X |
| 4,813,031 | 3/1989 | Bierhoff | 369/45 |
| 4,912,697 | 3/1990 | Enari et al. | 369/116 |

FOREIGN PATENT DOCUMENTS

| | | |
|---|---|---|
| 0183435 | 6/1986 | European Pat. Off. . |
| 0219170 | 4/1987 | European Pat. Off. . |
| 0220039 | 4/1987 | European Pat. Off. . |
| 3546320 | 7/1986 | Fed. Rep. of Germany . |
| 52-080802 | 7/1977 | Japan . |
| 52-134704 | 11/1977 | Japan . |

OTHER PUBLICATIONS

Drexon Laser Memory Card Equipment Development and Licensing Program "Quarterly Report No. 8", Jan. 1985, pp. 1–16.
Drexon Laser Memory Card Equipment Development and Licensing Program "Final Report", Jun. 1986, pp. 6-1 to 6-72.

*Primary Examiner*—Robert L. Richardson
*Attorney, Agent, or Firm*—Fitzpatrick, Cella, Harper & Scinto

[57] ABSTRACT

An optical information recording apparatus includes a recording device for condensing a light beam into a spot-like shape, the light beam having been intensity-modulated between at least two levels which are not zero, scanning the light beam on a recording medium and recording information thereon; a detector for detecting a signal indicative of the position error between the light beam spot and the medium in the focusing direction perpendicular to the surface of the medium or the tracking direction in a plane parallel to the surface of the medium which is perpendicular to tracks formed on the medium; a servo device for correcting the position error on the basis of the detected signal; a device for varying the gain of the servo device in conformity with the intensity level of the light beam for producing a gain output; and a device for sampling and holding the gain output as the intensity of the light beam shifts between different levels.

9 Claims, 5 Drawing Sheets

OPTICAL INFORMATION RECORDING APPARATUS PROVIDED WITH MEANS FOR SAMPLING AND HOLDING A SERVO SIGNAL WHEN THE INTENSITY OF A LIGHT BEAM VARIES BETWEEN INTENSITY LEVELS

This application is a continuation of prior application Ser. No. 07/711,423 filed Jun. 5, 1991, which application is a continuation of prior application Ser. No. 07/225,722 filed Jul. 28, 1988, both now abandoned.

BACKGROUND OF THE INVENTION

1. Field of the Invention

This invention relates to an apparatus for recording information by scanning a recording medium by a light beam condensed into a spot-like shape, and in particular, to an optical information recording apparatus provided with focusing and/or tracking servo means for the light beam.

2. Related Background Art

Among the forms of medium using light to record information thereon and to read the recorded information, are a disc-like form, a card-like form and a tape-like form. Among these, an optical information recording medium formed into a card-like shape (hereinafter referred to as the "optical card") has a great estimated demand as a medium of great recording capacity which is compact, and lightweight and convenient to carry.

Figure 1:
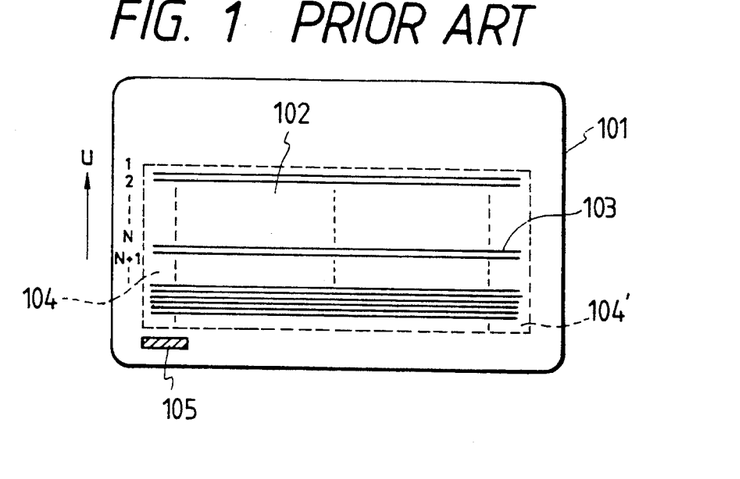
FIG. 1 is a schematic plan view showing an example of an optical card.

Referring to FIG. 1 of the accompanying drawings which is a schematic plan view of such an optical card 101, the reference numeral 102 designates an information recording area, the reference numeral 103 denotes information tracks, the reference numerals 104 and 104' designate track selecting areas, and the reference numeral 105 denotes the home position of a light beam spot.

On the optical card 101, information is optically detectably recorded as a record bit row (information tracks) with scanning the optical card by a light beam which is modulated in accordance with record information and concentrated into a minute spot. At that time, to record the information accurately without causing problems such as intersection between the information tracks, it is necessary to control the position of application of the light beam spot on the surface of the optical card in a direction perpendicular to the scanning direction (the lengthwise direction of the tracks) (auto tracking which will hereinafter be referred to as "AT"). It is also necessary to control the light beam in a direction perpendicular to the surface of the optical card (auto focusing which will hereinafter be referred to as "AF") to apply the light beam as a minute spot of stable size in spite of the bending or mechanical error of the optical card. Also, AT and AF are necessary during reproduction.

Figure 2:
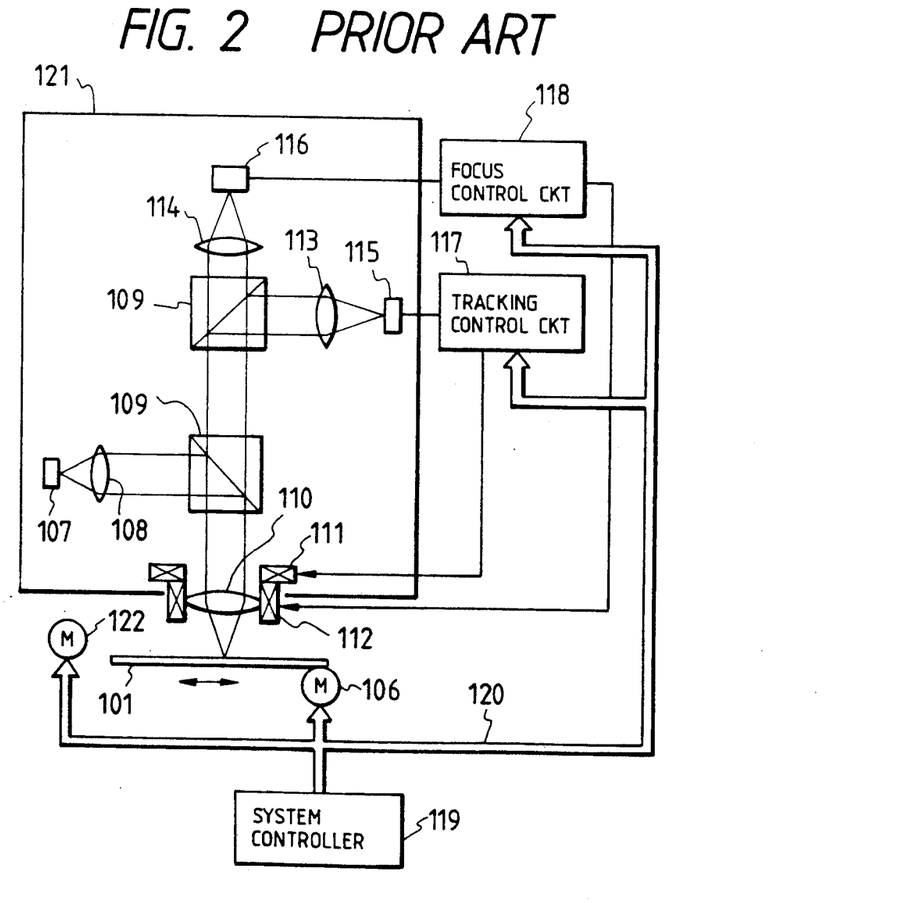
FIG. 2 is a schematic diagram showing an example of the construction of an apparatus for recording information on the optical card shown in FIG. 1.

Referring now to FIG. 2 of the accompanying drawings which shows the construction of an apparatus for recording and reproducing information on the optical card, the reference numeral 106 designates a motor for driving the optical card 101 in the direction of the arrow parallel to the lengthwise direction of the tracks, the reference numeral 107 denotes a light source such as a semiconductor laser, the reference numeral 108 designates a collimator lens for collimating the light from the light source 107, the reference numeral 109 denotes a beam splitter, the reference numeral 110 designates an objective lens, the reference numeral 111 denotes a coil for tracking, the reference numeral 112 designates a coil for focusing, the reference numerals 113 and 114 denote condensing lenses, the reference numerals 115 and 116 designate photoelectric conversion elements, the reference numeral 117 denotes a tracking control circuit, and the reference numeral 118 designates a focusing control circuit. Electric current is sent to the coil 111 for tracking and the coil 112 for focusing by the commands from the control circuits 117 and 118 on the basis of a tracking signal and a focusing signal detected by the photoelectric conversion elements 115 and 116 to thereby move the objective lens 110 and accomplish AT and AF. The reference numeral 119 designates a system controller for controlling the recording-reproducing apparatus, and the reference numeral 120 denotes a group of various control signals output from the system controller. Other signals than the signals 120 are also output from the controller 119, but they are not shown. The reference numeral 122 designates a drive motor for moving an optical head in the direction of arrow u in FIG. 1.

The light from the light source 107 is collimated by the collimator lens 108, passes through the beam splitter 109 and thereafter is condensed on a recording track on the optical card 101 by the objective lens 110. The light reflected by the recording track is now transmitted through the beam splitter 109 and is divided into two light beams by the beam splitter 109, and the divided light beams are condensed on the tracking signal detecting photoelectric conversion element 115 and the focusing signal detecting photoelectric conversion element 116, respectively, by the condensing lenses 113 and 114, respectively. Signals obtained by the photoelectric conversion elements 115 and 116 are made into a tracking error signal and a focusing error signal by the tracking control circuit 117 and the focusing control circuit 118, respectively, and electric current is sent to the coil 111 for tracking and the coil 112 for focusing, whereby the objective lens 110 is moved to thereby accomplish AT and AF.

Figure 3:
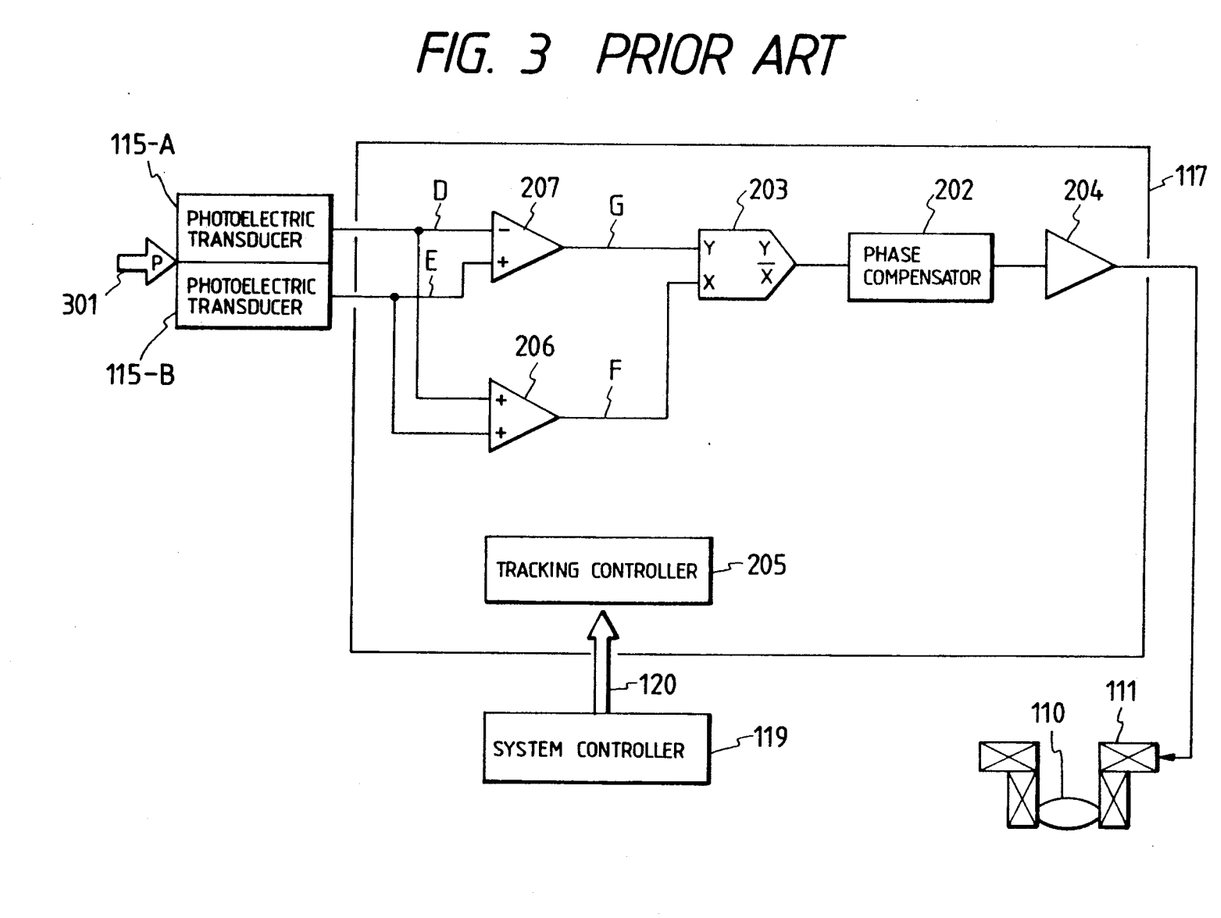
FIG. 3 is a block diagram showing an example of the prior art tracking control circuit used in the apparatus shown in FIG. 2.

FIG. 3 of the accompanying drawings is a detailed diagram of the tracking control circuit 117.

In FIG. 3, the reference numeral 301 designates reflected light originating from the light source being reflected by the medium, the reference characters 115-A and 115-B denote photoelectric conversion elements divided into two by a dividing line extending in a direction corresponding to the lengthwise direction of the tracks for detecting a tracking error, and the reference numeral 207 designates a subtraction circuit for subtracting signals D and E which are signals from the photoelectric conversion elements 115-A and 115-B and for outputting a tracking error signal. The reference numeral 206 denotes an adder circuit for adding the signals D and E together, the reference numeral 203 designates a dividing circuit for dividing the output G of the subtraction circuit 207 by the output F of the adder circuit 206, the reference numeral 202 denotes a phase compensator circuit for achieving the stabilization of AT servo, the reference numeral 204 designates a driver for sending a drive current to the objective lens, and the reference numeral 205 denotes a tracking controller for receiving the signal 120 from the system controller. 119 and controlling the entire tracking control circuit 117.

FIGS. 4A-4D of the accompanying drawings are timing charts of the signals, at various positions of the FIG. 3 circuit during recording.

Figure 4A:
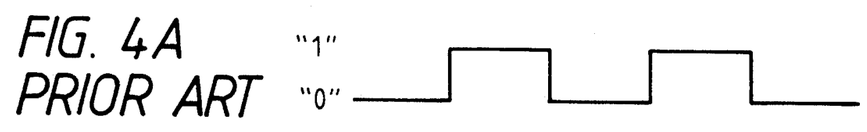
FIGS. 4A–4D are timing charts of signals in various portions of the circuit shown in FIG. 3.
Figure 4B:
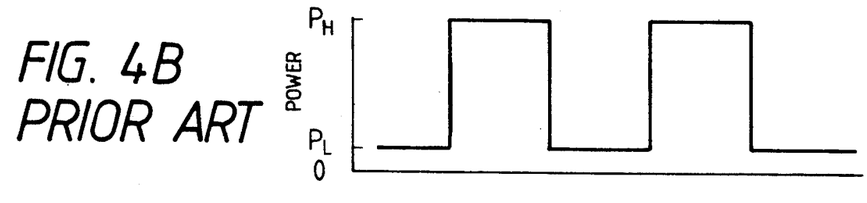
Figure 4C:
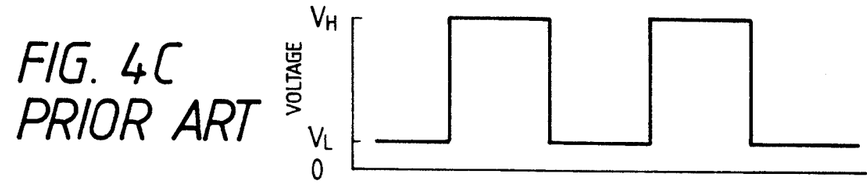
Figure 4D:
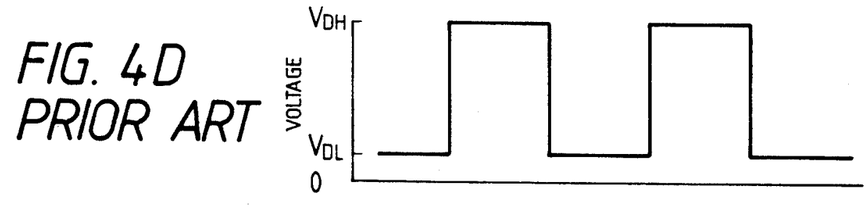

FIG. 4A shows a record information signal, FIG. 4B shows a variation in the power P of the light source modulated by said signal, FIG. 4C shows a variation in the voltages of tracking signals D and E obtained by the power of the light source via the photoelectric conversion elements 115-A and 115-B, and FIG. 4D shows a variation in the voltage of a signal F which is the addition signal of the tracking signals D and E.

By "1" and "0" of the record information, the power P of the light source is varied into two stages $P_H$ and $P_L$, and setting is made so that when the power is $P_H$, a pit is formed and when the power is $P_L$, no pit is formed. At this time,. the signals D and E are also varied into two stages and therefore, if these signals D and E are only subtracted, the open loop gain of AT servo when the power of the light source is $P_H$ becomes $P_H/P_L$ times as great as the open loop gain of AT servo when the power of the light source is $P_L$. This has led to the problem that oscillation is liable to occur and the servo becomes unstable. Particularly in the case of an optical card in which the line speed is low and the zone of record information is near the zone of AT servo, the component of the record information mixes with the AT servo with a result that the objective lens is unnecessarily moved and thus, stable AT servo becomes impossible. Consequently, as an example for making the open loop gain of AT servo constant both when the power of the light source is $P_L$ and when the power of the light source is $P_H$, there is a method using the dividing circuit 203 as shown in FIG. 3. That is, the output G of the subtraction circuit 207 is input to the numerator side input terminal Y of the dividing circuit 203 and the output signal F of the adder circuit 206 is input to the denominator side input terminal X of the dividing circuit 203. Thus, the variation by record modulation is offset, because even if the signals D and E are varied into $V_L$ and $V_H$ as shown in FIG. 4C, the signal F is likewise varied into $V_{DL}$ and $V_{DH}$ as shown in FIG. 4D, and the open loop gain of AT servo can always be made constant and it becomes possible to accomplish a stable AT servo operation.

Figure 5:
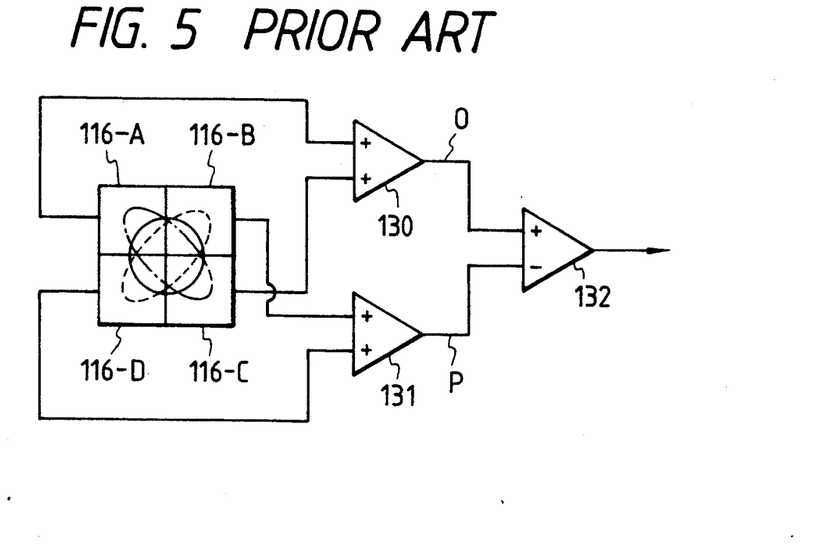
FIG. 5 is a block diagram showing an example of a circuit for obtaining a focusing signal in the apparatus shown in FIG. 2.

This method is also applicable to AF servo. For example, a focusing signal is detected by using an anamorphic optical system such as a toric lens like the lens 114 of FIG. 2 and using, as the photoelectric conversion element 116, an element whose light-receiving surface is divided into four portions 116-A to 116-D as shown in FIG. 5. A spot condensed on this light-receiving surface by the lens 114 is circular when the light beam is focused on the medium, but when out-of-focus, the spot is deformed in conformity with the direction of the out-of-focus as indicated by the broken line and the dot-and-dash line in FIG. 5 of the accompanying drawings. Accordingly, the sum signal 0 of the outputs of portions 116-A and 116-C which are at diagonal positions and the sum signal P of the outputs of portions 116-B and 116-D are calculated by adders 130 and 131, respectively, and these are differentiated by a differential amplifier 132 to thereby obtain a focusing signal.

The basic construction of the optical card recording-reproducing apparatus as described above is disclosed, for example, in U.S. Pat. No. 4,912,697. Also, the dividing circuit of the focusing servo is described in Japanese Laid-Open Patent Application No. 52-134704.

However, the dividing circuit 203 in the above-mentioned example of the prior art requires complicated analog processing therein and therefore, is expensive and lacks precision. This has led to an increased expense of the servo circuit as a whole and to the disadvantage that the accuracy of the information recording is reduced.

On the other hand, an optical information recording-reproducing apparatus in which the gain of the focusing servo is changed over between the time of recording and the time of reproduction during which the intensity of the light beam applied to the medium differs is disclosed in Japanese Laid-Open Patent Application No. 52-80802. However, again in this apparatus, there has been the problem that during recording, the gain is always constant and particularly at a point of time when the intensity of the light beam varies, servo becomes unstable.

SUMMARY OF THE INVENTION

It is the object of the present invention to solve the above-noted problems peculiar to the prior art and to provide an optical information recording apparatus which is simple in construction and which accomplishes stable servo operation even at a point of time when the intensity of a light beam is varied.

The above object of the present invention is achieved by an optical information recording apparatus comprising means for condensing into a spot-like shape, a light beam intensity-modulated between at least two levels which are not zero, scanning the light beam on a recording medium and recording information thereon, means for detecting a signal indicative of position error between the light beam spot and the medium in the focusing direction perpendicular to the surface of the medium and/or the tracking direction in a plane parallel to the surface of the medium which is perpendicular to tracks formed thereon, servo means for correcting the position error on the basis of the detected signal, means for varying the gain of said servo means in conformity with the intensity level of the light beam, and means for sampling and holding the detected signal when at least the intensity of the light beam is halfway of the shift between different levels.

DESCRIPTION OF THE PREFERRED EMBODIMENT

The present invention will hereinafter be described in detail with respect to an optical card recording apparatus.

Figure 6:
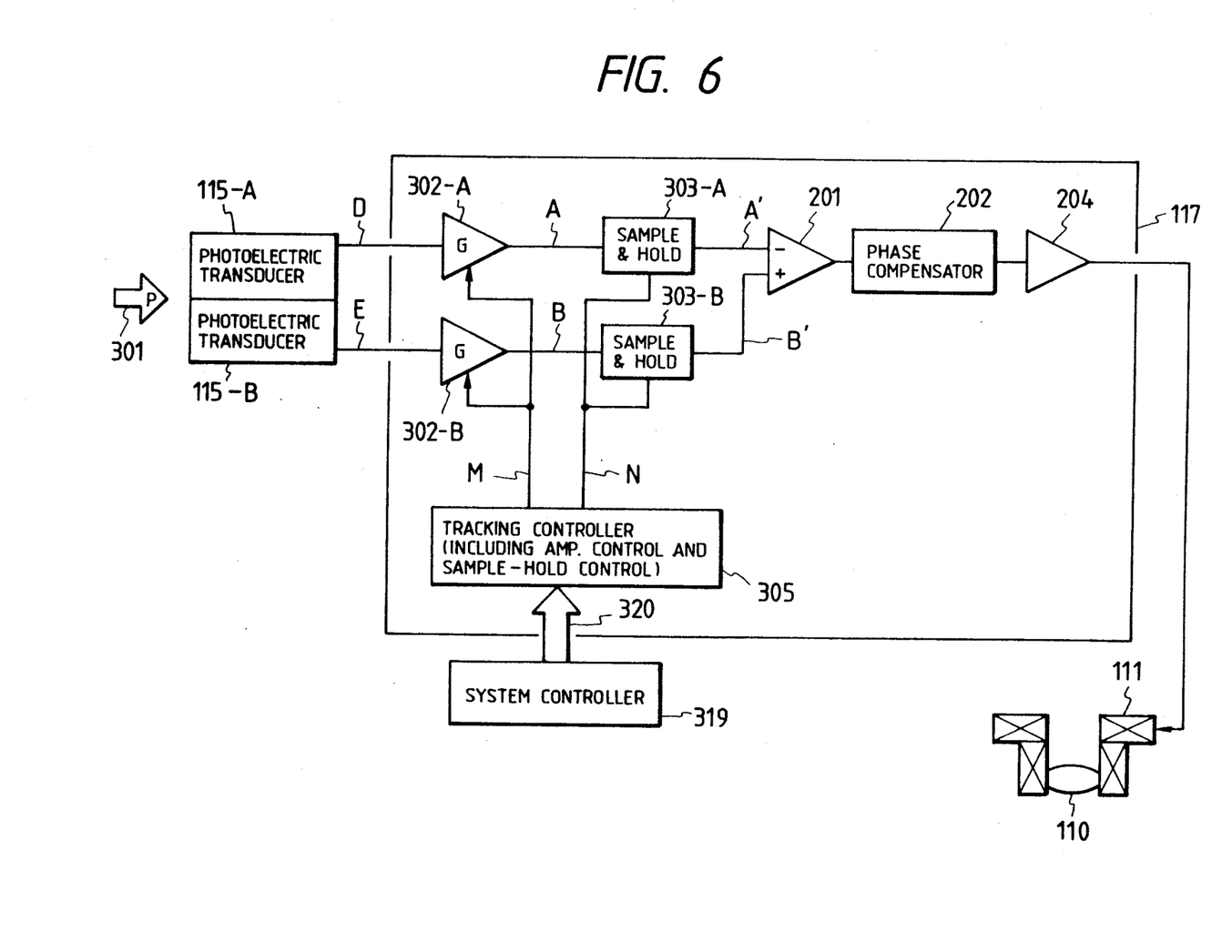
FIG. 6 is a block diagram showing an embodiment of a tracking control circuit used in an optical information recording apparatus according to the present invention.

FIG. 6 is a block diagram showing an embodiment of the tracking control circuit of an optical information recording apparatus according to the present invention. This circuit is intactly incorporated in the construction shown in FIG. 2. In FIG. 6, members identical to those in FIG. 3 are given identical reference numerals and need not be described in detail. In FIG. 6, the reference characters 302-A and 302-B designate amplifiers which can change over the amplification degree into at least two stages by a signal M from a tracking controller 305. The reference characters 303-A and 303-B denote circuits for sampling and holding output signals A and B from the amplifiers 302-A and 302-B, respectively, by a signal N from the tracking controller 305.

The reference numeral 319 designates a system controller for controlling the entire system, and the reference numeral 320 denotes a signal output from the system controller 319 to the tracking controller 305.

The tracking controller 305 according to the present invention controls the amplification degrees of the amplifiers 302-A and 302-B and also controls sampling and holding circuits 303-A and 303-B on the basis of a predetermined signal. The reference numeral 201 designates a subtraction circuit for subtracting signals A' and B' which are the output signals of the sampling and holding circuits 303-A and 303-B and for outputting a tracking error.

FIGS. 7A–7G are timing charts of respective signals at the respective positions of the circuit of FIG. 6.

Figure 7A:
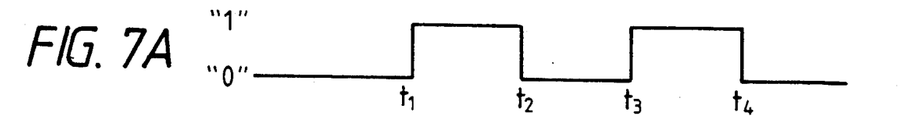
FIGS. 7A–7G are timing charts of signals in various portions of the circuit shown in FIG. 6.
Figure 7B:
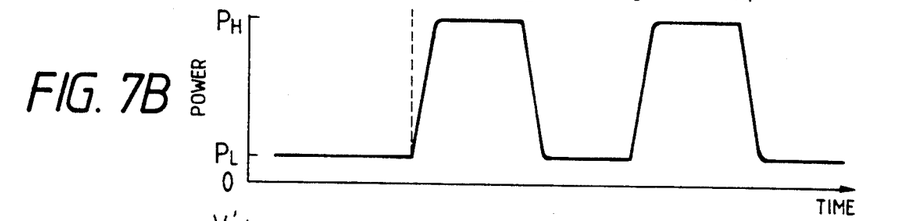
Figure 7C:
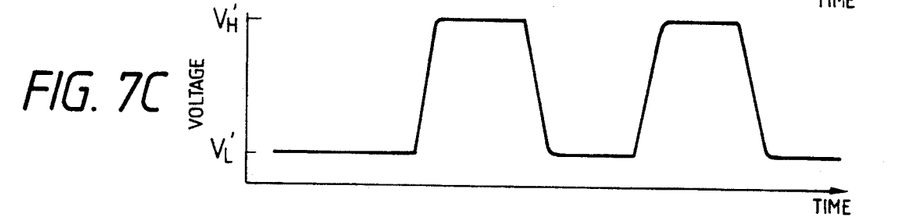
Figure 7D:
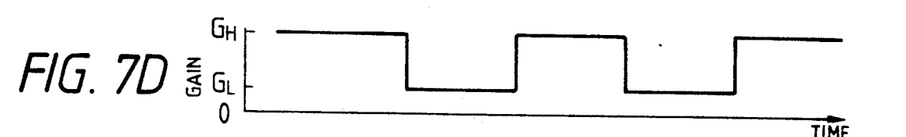
Figure 7E:
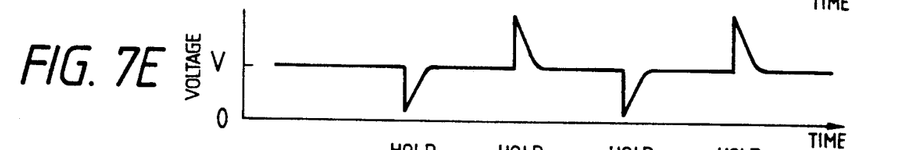
Figure 7F:
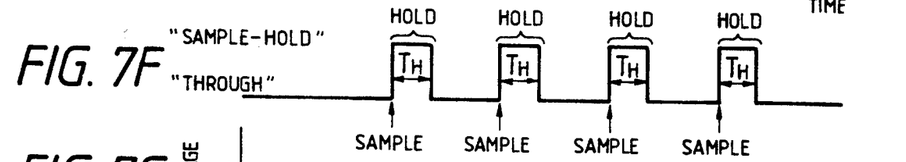
Figure 7G:
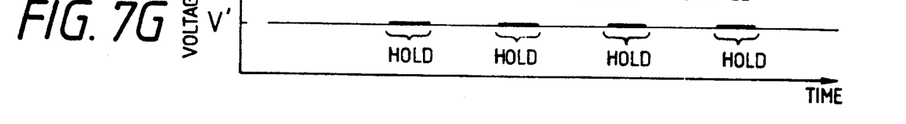

More specifically, FIG. 7A is a chart of a record information signal, FIG. 7B is a chart showing a variation in the power P of a light source modulated by said signal, FIG. 7C is a chart showing variation in the voltage of tracking signals D and E obtained by the power P of the light source via photoelectric conversion elements 115-A and 115-B, FIG. 7D is a chart showing the manner in which the amplification degrees are changed over to $G_H$ and $G_L$ correspondingly to the record information signal shown in FIG. 7A, FIG. 7E is a chart showing the voltages at points A and B in FIG. 6, FIG. 7F shows a sampling and holding drive signal in the signal D, and FIG. 7G is a chart showing the voltages at points A' and B'.

The operation of the tracking control circuit according to the present invention will now be described with reference to FIGS. 6 and 7A–7G.

When the record signal varies in accordance with binary information indicated by "1" and "0" as shown in FIG. 7A, the power of the light source also varies as indicated by "$P_H$" and "$P_L$", in FIG. 7B. The apparatus conditions are set so that when the power is "$P_L$", no pit is formed and when the power is "$P_H$", a pit is formed. Thus, in FIG. 6, the signals D and E from the photoelectric conversion elements 115-A and 115-B, respectively, change to "$V_L$" and "$V_H$" in proportion to the power P of the light source (see FIG. 7C). At this time, the gain G of the variable gain amplifiers 302-A and 302-B is changed over to two stages "$G_L$" and "$G_H$" by the signal M to keep the open loop gain of the AT servo constant. The signal M corresponds to the record information "1" and "0". At this time, the gains $G_L$ and $G_H$ are preset so as to satisfy the following condition:

$$P_H \cdot G_L = P_L \cdot G_H = k \text{ (constant)}$$

Thus, the output signals A and B from the amplifiers 302-A and 302-B become $V_{AB}$ which is constant both during the recording of the pit and during nonrecording of the pit. That is, $V_{AB}$ is $$V_{AB} = V_H \cdot G_L = V_L \cdot G_H$$

and the open loop gain of AT servo can always be kept constant, and accurate recording becomes possible.

However, when as shown in FIG. 7B, the state of variation in the power P of the light source (for example, the state of rising and falling) is not identical to the state of variation in the amplification degree G of the amplifiers, $$P \cdot G \neq k$$

is brought about at $t_1, t_2, t_3, t_4, ...$ which are the points of variation in the power of the light source.

For example, at $t_1$ and $t_3$, the open loop gain of the tracking servo becomes lower than the usual value k and becomes weak due to disturbance, and conversely, at $t_2$ and $t_4$, the open loop gain becomes greater than the usual value k and oscillation becomes ready to occur. Thus, tracking servo becomes unstable (see FIG. 7E). So, in the present invention, prior to the point of time $t_1$ at which the record information varies, the signal A and the signal B are sampled by the signal N (see FIG. 7F). Thereafter, they are held for a time $T_H$ and are output as a signal A' and a signal B' (see FIG. 7F). By repeating this, the variation in the open loop gain can be eliminated and the tracking servo can be stabilized, and accurate recording becomes possible (see FIG. 7G).

Also, as compared with the conventional sample-hold control, in the present embodiment, the hold time can be made short and the through time can be made long and therefore, the phase delay of the tracking servo by the sample-hold becomes small, which is effective.

While AT servo has been described, the present invention is equally applicable to AF servo also. For example, if in the circuit shown in FIG. 6, signals 0 and P, instead of signals D and E, are input and the output signal of a driver 204 is input to a coil 112 for focusing shown in FIG. 2, stable AF servo can be accomplished.

The present invention is not restricted to the above-described embodiment, but permits various modifications and applications.

For example, in the above-described embodiment, the signal A and the signal B are sampled and held, whereas the present invention is not restricted thereto. The signal of the other portion in the servo loop may be sampled and held to achieve a similar effect.

Also, the above-described embodiment has been shown with respect to an example in which sample-hold is effected both when the intensity of the light beam emitted from the light source increases and when the intensity decreases, but effecting sample-hold either when the intensity increases or when the intensity decreases is also effective.

Further, the above embodiment has been described with respect to an apparatus in which the amplification degree of the amplifiers is changed over to a predetermined value, whereas the present invention can also be applied to an apparatus in which the gain varies in an analog fashion in conformity with the intensity of the light beam.

Also, in the above-described embodiment, sample-hold has been effected when the intensity of the light beam conforming to the record signal varies, but when recording and reproduction are effected by the same apparatus, sample-hold may be effected when the intensity of the light beam is changed over between the recording mode and the reproducing mode. Also, in other cases when the intensity of the light beam varies, for example, in a case when the intensity is further reduced below the level during reproduction in order to prevent destruction of medium by the prolonged exposure of the light spot during standby of the recording or reproducing operation, sample-hold may be executed.

Further, the present invention is applicable not only to an apparatus using a postscript type recording medium, but also to an apparatus using a rewritable type recording medium such as a magneto-optical recording medium. Further, the shape of the medium may be any shape such as a card-like shape, a disc-like shape or a tape-like shape.

The present invention covers all such applications without departing from the scope thereof as defined in the appended claims.

What is claimed is:

1. An optical information recording apparatus for optically recording information on a recording medium, said apparatus comprising:
   means for condensing a light beam into a light beam spot, intensity modulating means for intensity modulating the light beam between at least two discrete non-zero intensity levels based on the information to be recorded, and means for scanning the light beam on a recording medium to record the information thereon;
   detecting means for detecting a position error signal indicative of a position error between the light beam spot and the recording medium ion at least one of a focusing direction perpendicular to the surface of the medium and a tracking direction in a plane parallel to the surface of the medium which is perpendicular to tracks formed on the medium;
   servo means for correcting the position error on the basis of the position error signal detected by said detecting means;
   gain varying means for varying gain of said servo means in accordance with the intensity level of the light beam;
   sampling and holding means for sampling and holding the position error signal; and
   control means for controlling said sampling and holding means to cause said sampling and holding means to sample and hold the position error signal as long as the intensity of the light beam is at least halfway between different levels during shift in intensity levels.

2. An optical information recording apparatus according to claim 1, wherein said sampling and holding means samples and holds said detected signal prior to the intensity of the light beam shifting to another level, and releases the hold after said shift is terminated and before a next shift is started.

3. An optical information recording apparatus according to claim 1, wherein said signal detecting means comprises a photoelectric conversion element which receives the portion of the light beam reflected by said recording medium.

4. An optical information recording apparatus according to claim 1, wherein said means for varying the gain varies the gain so that the product of the power of said light beam and the gain is constant.

5. An optical information recording apparatus according to claim 1, wherein said scanning means comprises an optical head including a light source and an objective lens for condensing a light beam emitted from said light source, and a motor for moving said recording medium relative to said optical head in the lengthwise direction of the tracks.

6. An optical information recording apparatus according to claim 5, wherein said servo means comprises means for driving said objective lens in at least one of the focusing and tracking directions, and an electric circuit for feeding back said detected signal to said driving means.

7. An optical information recording and reproducing apparatus having a plurality of operating modes including at least one of a recording mode for optically recording information on a recording medium and a reproducing mode for reproducing the information recorded on the recording medium, said apparatus comprising:
   means for condensing a light beam into a light beam spot, intensity modulating means for intensity modulating the light beam between at least two discrete non-zero levels based on the operating mode, and means for irradiating the light beam onto the recording medium to perform one of the operating modes;
   detecting means for detecting a position error signal indicative of a position error between the light beam spot and the recording medium in at least one of a focusing direction perpendicular to the surface of the medium and a tracking direction in plane parallel to the surface of the medium which is perpendicular to tracks formed on the medium;
   servo means for correcting the position error on the basis of the position error signal detected by said detecting means;
   gain varying means for varying gain of said servo means in accordance with the intensity level of the light beam;
   sampling and holding means for sampling and holding the position error signal; and
   control means for controlling said sampling and holding means to cause said sampling and holding means to sample and hold the position error signal as long as the intensity of the light beam is at least halfway between different levels during a shift in intensity levels.

8. An optical information recording and reproducing apparatus according to claim 7, wherein said sampling and holding means comprises means for sampling and holding the gain output prior to a first shift in intensity level of the light beam occurs and releases the hold after the first shift terminates and prior to a subsequent shift.

9. An optical information recording apparatus for optically recording information on a recording medium, said apparatus comprising:
   means for condensing a light beam into a light beam spot, intensity modulating means for intensity modulating the light beam between at least two discrete non-zero intensity levels based on the information to be recorded, and means for scanning the light beam on the recording medium to record the information thereon;
   detecting means for detecting a position error signal indicative of a position error between the light beam spot and the recording medium in at least one of a focusing direction perpendicular to the surface of the medium and a tracking direction in a plane parallel to the surface of the medium, which direction is perpendicular to tracks formed on the medium;

servo means for correcting the position error on the basis of the position error signal detected by said detecting means;

gain changing means for changing gain of said servo means to a plurality of predetermined values; and control means for controlling said gain changing means in accordance with the information to be recorded.

* * * * *

UNITED STATES PATENT AND TRADEMARK OFFICE
CERTIFICATE OF CORRECTION

PATENT NO. : 5,150,345
DATED : September 22, 1992
INVENTOR(S) : Satoshi Shikichi, et al.

It is certified that error appears in the above-identified patent and that said Letters Patent is hereby corrected as shown below:

COLUMN 4

Line 38, "at least" should be deleted; and
Line 39, "halfway of the shift" should read --at least halfway in a shift--.

COLUMN 7

Line 30, "ion" should read --in--; and
Line 47, "during shift" should read --during a shift--.

COLUMN 8

Line 48, "to a" should read --to when a--.

Signed and Sealed this

Twelfth Day of October, 1993

Attest:

BRUCE LEHMAN

Attesting Officer

Commissioner of Patents and Trademarks